United States Patent [19]

Sullivan

[11] Patent Number: 4,954,972
[45] Date of Patent: Sep. 4, 1990

[54] COLOR SIGNATURE SENSOR

[75] Inventor: Charles T. Sullivan, Burnsville, Minn.

[73] Assignee: Honeywell Inc., Minneapolis, Minn.

[21] Appl. No.: 118,585

[22] Filed: Nov. 9, 1987

[51] Int. Cl.$^5$ .......................... G06F 15/70; G01J 1/18
[52] U.S. Cl. ..................................... 364/526; 356/408
[58] Field of Search ................ 364/526, 485; 356/405,
356/319, 255, 408, 402, 425; 324/77 B

[56] References Cited

U.S. PATENT DOCUMENTS

| | | | |
|---|---|---|---|
| 4,214,835 | 7/1980 | Roos | 356/306 |
| 4,322,807 | 4/1982 | Chamran et al. | 364/498 |
| 4,449,821 | 5/1984 | Lee | 356/319 |
| 4,488,811 | 12/1984 | Fukuma | 356/319 |
| 4,544,271 | 10/1985 | Yamamoto | 356/328 |
| 4,560,275 | 12/1985 | Goetz | 356/326 |
| 4,563,090 | 1/1986 | Witte | 356/328 |
| 4,629,322 | 12/1986 | Pollard | 356/319 |
| 4,635,213 | 1/1987 | Murata et al. | 364/526 |
| 4,648,051 | 3/1987 | Wandell et al. | 364/526 |
| 4,653,014 | 3/1987 | Mikami et al. | 364/526 |
| 4,654,794 | 3/1987 | O'Brien | 356/405 |
| 4,660,977 | 4/1987 | Wittmer | 356/319 |
| 4,758,085 | 7/1988 | Lequime et al. | 356/319 |

OTHER PUBLICATIONS

Product Brochure; EG & G Reticon "G Series Solid State Line Scanners".
Norman Stauffer & Denny Wilwerding, "Electronic Focus For Cameras", Scientific Honeyweller, vol. 3, No. 1, Mar. 1982, pp. 1-13.

Primary Examiner—Felix D. Gruber
Attorney, Agent, or Firm—Gregory A. Bruns

[57] ABSTRACT

A color signature sensor for color recognition or discrimination utilizing a spectral analysis system for use as a process control for automation and on-line quality assurance. An object to be observed is illuminated by a suitable light source, light collected from the object under examination is routed into a monochromator. The output of the monochromator is fed to an analog-to-digital converter and analyzed by a microprocessor.

4 Claims, 3 Drawing Sheets

COLOR SIGNATURE SENSOR

BACKGROUND AND SUMMARY OF THE INVENTION

This invention is directed to a field of color signature sensor used in process automation which performs color recognition of objects for the purposes of identification, sorting or matching.

In this invention reflected (or transmitted) light from an illuminated object (or process) is transmitted optically to a spectral dispersive element in the form of a concave diffraction grating. Spectrally dispersed light from the grating is focussed on a photodetector array which generates a spatially discretized analog signal representing the color signature of the object. The signal is then converted to digital form and sent to a microprocessor for processing. The sampled and digitized signal is a unique and complete description of the colored object being observed. Cross-correlation and mean-value statistics are used by the microprocessor for color recognition.

DESCRIPTION

Figure 1:
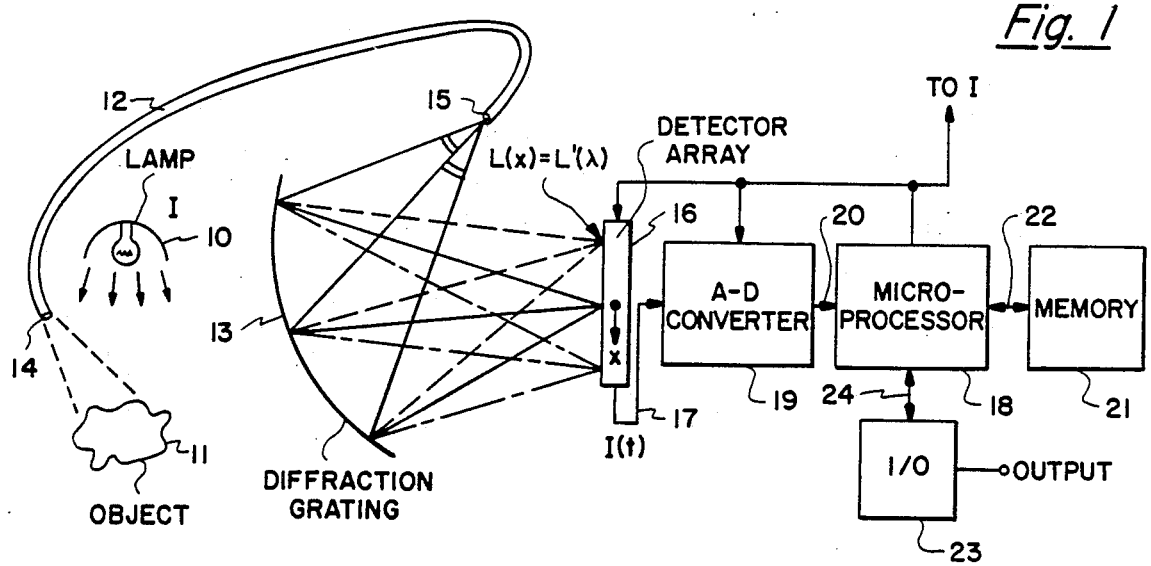
FIG. 1 is a partial block diagram of an embodiment of the invention.

Referring now to the apparatus shown in FIG. 1 there is shown an illumination source (I) or lamp 10 for properly illuminating an object 11 to be observed. Object 11 may be, for example, individual piece parts moving along a conveyor belt of a production line in which it is needful to compare the color of each part against the color of a reference part. Color perception depends on the spectral energy density of the illumination source 10, the spectral reflectance (or transmittance) distribution of the object 11 and the spectral responsivity characteristics of the signal acquisition (the optics portion) system herein described.

Diffusely reflected (or transmitted) light from an illuminated object, such as 11, is collected by a fiber optic probe 12 that routes the light signal to the input of a monochromator shown in the form of a spectral dispersive element 13. The fiber optic path is exemplary only and the light from the object may be otherwise optically directed to the spectral dispersive element. Additional optics may be located at the input end 14 of the fiber to affect signal collection efficiency, angle-of-view, and the like. Similarly, additional optics may be located at the output end 15 of the fiber to affect better spot-size matching or far-field divergence angle matching to the spectral dispersive element 13.

Figure 2:
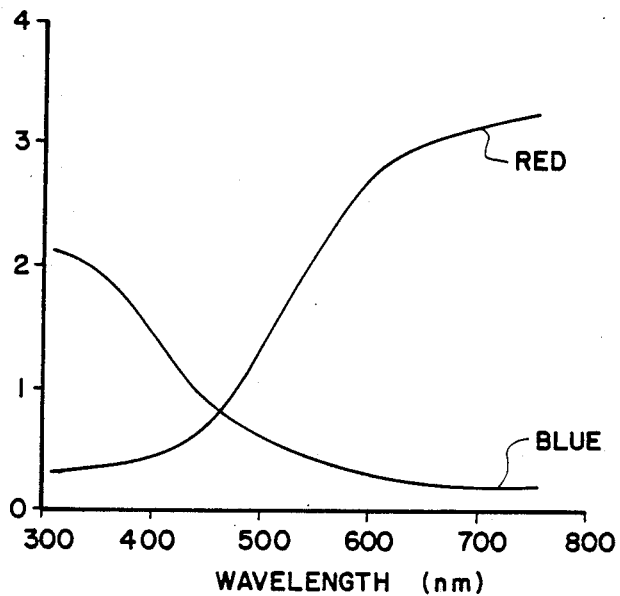
FIG. 2 is a typical spectral signature of standard blue and standard red color chips.

The spectral dispersive element 13 may consist of a blazed concave diffraction grating as shown, or may consist of other spectral dispersive configurations (generally called monochromator) that are known to those skilled in optics. The essential function of concave diffraction grating 13 is to image the fiber output face 15 onto the input face of a detector array 16 and to disperse it spectrally (that is, to angularly decompose the input light distribution into the continuous spectrum of pure colors, each described by a specific wavelength) over the spatial extent of the acceptance aperture of array 16. The spatial characteristics of the array and of the individual photodiodes of the array, as well as its physical alignment with respect to 15 and 13, are chosen such that the spectrally dispersed signal of interest falls within the acceptance aperture of the array. The output of each photodiode in the array corresponds to the time- and space-integrated intensity of a specific band of pure color wavelengths in the light from object 11. This spectrally dispersed light distribution is the color signature $L(x) = L'(\lambda)$ of the illuminated object where $\lambda$ represents wavelength of light and x represents the spatial extension of the array. For colorimetry applications $L'(\lambda)$ extends from $\lambda \cong 400$ nm to $\lambda \cong 700$ nm; for other applications, the range of $\lambda$ is not restricted to the visible band thus permitting the inclusion of invisible wavelength bands for various additional applications such as counterfeit detection. The photodetector array may be similar, for example, to the EG&G RETICON solid state line scanners RL128G, the Honeywell TCL chip, or the like. This detector array 16 consists of a linear sequence of photodetectors that detects the light distribution $L(x) = L'(\lambda)$ and converts it to a time-dependent electrical current I(t) on wiring 17 that is clocked out in response to timing signals from the microcontroller/microprocessor 18. The array is scanned by the processor once every five to twenty milliseconds depending on the application with 16.67 milliseconds being one of the preferred intervals. A typical spectral distribution from a standard red and a standard blue color chip is seen in FIG. 2. In general, the signal I(t) on wiring 17 is an aperiodic, analog current that represents the signal data from the object 11 acquired by the optics hardware described above. Under static object illuminations, I(t) becomes periodic with successive scans and represents the acquired color signature. Multiple samples of the color signature of the same object under the same illumination can be used to reduce the noise present in each signature alone.

The signal I(t) first flows into a sample-and-hold analog-to-digital converter 19 that forms a digital word description sequence of the colored object 11. The digitized output from 19 is connected by wiring 20 to microprocessor 18. The microprocessor also interfaces with a system memory 21 by wiring 22 and also with an input-output (I/O) buffer device 23 by wiring 24. The processor can remember a number (such as eight) of color signatures each of which uniquely represents (eight) sample/reference colors. Sample/reference colors can be trained by putting a sample/reference object in the sensor's field-of-view, selecting a channel with a switch and pressing a "train" button. The color signature of the sample/reference object is then stored in memory. Data processing can be free-running at an exemplary speed of approximately sixty-eight spectrum-comparing operations being performed per second. The match/no-match outputs between incoming signature data and memory signature data can be updated after each compare operation or they can be latched by a higher level controller or external trigger when an object is properly in the sensor's field-of-view and thus when the outputs are valid. Under higher level control the color signatures can be trained, dumped or loaded through a serial port to facilitate day-to-day or product-to-product reprogramming and off-line training. For convenience the digitized signature output at 20 can be described as an m×n matrix $I_{mn}$, where m is the number of photodetectors (or pure color sample bands) in the array and n is the bit precision of the digitization process, that is, n may be thought of as the number of bits resolved in the analog to digital converter. As an example m may be about 24–32 and n may be about 8–12. Generally m and n can be traded off with one another to meet various performance and cost constraints. The uniqueness and completeness of $I_{mn}$ as a signature description of a colored object is preserved in this digitization process provided m and n are chosen appropriately. All systematic aberrations occurring in the optical fiber 12 from the fiber input 14 to the fiber output 15, the diffraction grating 13, and the detector array 16 are incorporated implicitly in $I_{mn}$. It is necessary to account for these aberrations only if the sensor output is an NBS-traceable color determination. Color recognition and discrimination outputs do not require aberration correction or compensation because all the acquired color signatures contain the same systematic aberrations. Any time-dependent or random system variations can be accounted for by acquiring cross-correlation and mean-value statistics for sequential acquisitions of the color signature of a static object. These statistics give what is equivalent to an autocorrelation function for this system (that is, system reproducibility and system error). This autocorrelation function essentially determines the color discrimination threshold for any two or more samples as described below. The simplest and probably the most useful data analysis scheme is to indicate whether the current color signature matches one or more reference signatures. Good success has been had using cross-correlation and mean difference formulae. The cross-correlation gives a statistical indication of "how good" the match (primarily in hue and chroma) is between two signatures, while the difference between the mean-values of each signature gives an indication of the difference primarily in brightness (or value).

The color sensor's basic programming is designed for process control monitoring for factory automation and on-line quality assurance and not for absolute color analysis. In many respects this mimics a human inspector in that the sensor can not readily describe the color that it is currently seeing, but by. comparing stored spectra to the current scene it can recognize very subtle color differences. The sensor's memory for colors and its speed, however, are far superior to the human eye and brain. Color recognition and discrimination are obtained according to the following description: Suppose the sampled and digitized signature from object 11 (sample A) is given as the sequence described collectively as $$I_{mn}(A) = \overset{m-1}{\underset{i=0}{S}} a_i = (a_0, a_1, a_2, \ldots a_{m-1}) \quad (1)$$

That is, $$\overset{m-1}{\underset{i=0}{S}} a_i$$

is a shorthand notation for the sequence of ordered numbers $(a_0, a_1, a_2 \ldots a_{m-1})$. The $a_i$'s are the weighted pure color values within the analog-to-digital converter 19 after sample-and-hold and analog-to-digital conversion. The $a_i$'s represent the time- and space-integrated light values from each of the m photodetectors that constitute and collectively describe the object's color signature. That is, the color signature consists of an ordered sequence of weighted pure color bands with a one-to-one correlation of the color bands to the $a_i$'s. This provides the common basis for measuring the similarity of one sample with respect to the next.

Figure 3:
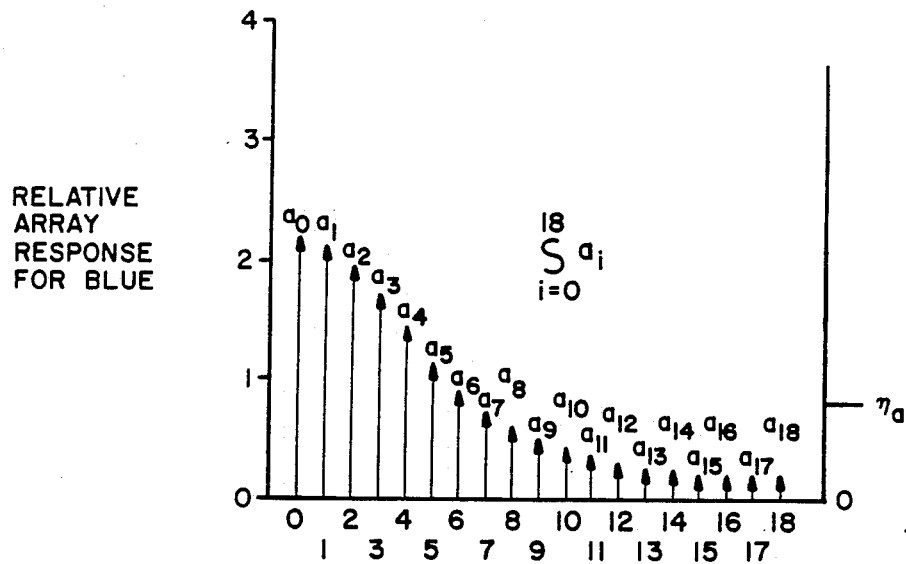
FIGS. 3 and 4 show sampled values comprising the analog signal for the blue and red colors, respectively.

FIG. 3 shows an example of the ordered sequence of numbers $$I_{mn}(A) = \overset{m-1}{\underset{i=0}{S}} a_i$$

that represents the sample-and-hold values of the continuous color signature of the standard blue in FIG. 2. The choice of m=19 in FIG. 3 is exemplary only.

Similarly suppose the sampled and digitized signature from object 11 (sample B) is given as $$I_{mn}(B) = \overset{m-1}{\underset{i=0}{S}} b_i = (b_0, b_1, b_2, \ldots b_{m-1}) \quad (2)$$

Figure 4:
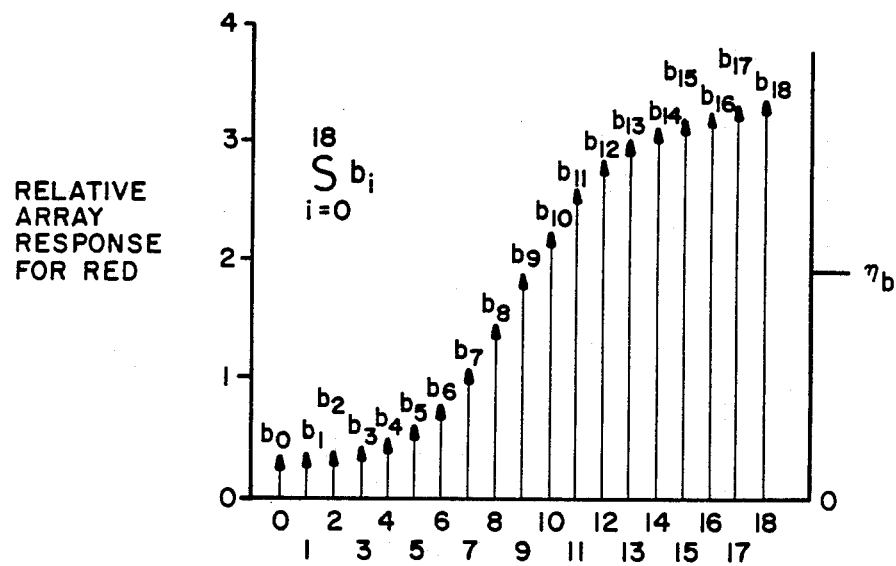

The notation and meaning of $I_{mn}(B)$ is similar to that described for $I_{mn}(A)$, except that $I_{mn}(B)$ refers to sample B and $I_{mn}(A)$ refers to sample A. FIG. 4 shows the ordered sequence of numbers $$I_{mn}(B) = \overset{m-1}{\underset{i=0}{S}} b_i$$

that represents the sample-and-hold values of the continuous color signature of the standard red in FIG. 2. Again, the choice of m=19 in FIG. 3 is exemplary only.

The signature mean (or average) values are defined by $$\eta_a = (1/m) \overset{m-1}{\underset{i=0}{\Sigma}} a_i \quad (3)$$

and $$\eta_b = (1/m) \overset{m-1}{\underset{i=0}{\Sigma}} b_i \quad (4)$$

where $\Sigma$ is the summation of m weighted values. Thus $\eta_a$ and $\eta_b$ may also be written $$\eta_a = (a_0 + a_1 + \ldots + a_{m-1})/m \quad (5)$$

and $$\eta_b = (b_0 + b_1 + \ldots + b_{m-1})/m. \quad (6)$$

FIGS. 3 and 4 show the approximate values $\eta_a$ and $\eta_b$ corresponding to $$\overset{18}{\underset{i=0}{S}} a_i$$

for blue and $$\overset{18}{\underset{i=0}{S}} b_i$$

for red, respectively, in FIG. 2. The cross-correlation $\psi$ between $I_{mn}$ (A) and $I_{mn}$ (B) is given as $$\psi(A,B) \equiv \frac{\sum_{i=0}^{m-1} (a_i - \eta_a)(b_i - \eta_b)}{\left\{\sum_{i=0}^{m-1} (a_i - \eta_a)^2\right\}^{\frac{1}{2}} \left\{\sum_{i=0}^{m-1} (b_i - \eta_b)^2\right\}^{\frac{1}{2}}} \quad (7)$$

The numerator can be expanded explicitly as $$\sum_{i=0}^{m-1} (a_i - \eta_a)(b_i - \eta_b) = (a_0 - \eta_a)(b_0 - \eta_b) + \quad (8)$$

$$(a_1 - \eta_a)(b_1 - \eta_b) + \ldots + (a_{m-1} - \eta_a)(b_{m-1} - \eta_b)$$

and the denominator factors can be expanded explicitly as $$\left\{\sum_{i=0}^{m-1} (a_i - \eta_a)^2\right\}^{\frac{1}{2}} = \quad (9)$$

$$\sqrt{(a_0 - \eta_a)^2 + (a_1 - \eta_a)^2 + \ldots + (a_{m-1} - \eta_a)^2}$$

and $$\left\{\sum_{i=0}^{m-1} (b_i - \eta_b)^2\right\}^{\frac{1}{2}} = \quad (10)$$

$$\sqrt{(b_0 - \eta_b)^2 + (b_1 - \eta_b)^2 + \ldots + (b_{m-1} - \eta_b)^2}$$

The mean-value difference $\phi$ between $I_{mn}$ (A) and $I_{mn}$ (B) is given as $$\phi(A,B) = \eta_a - \eta_b. \quad (11)$$

By definition, $\psi(A,A) = 1$; however, since nonzero noise sources are always present, $\psi(A,A') < 1$ where $I_{mn}$ (A') represents any sequential signature sample of A. Similarly, it is generally true that $\Phi(A,A') \neq 0$. For convenience, we can take $\psi(A,A')$ and $\Phi(A,A')$ jointly to represent the total system error indicative of the system autocorrelation. (Similarly, $\psi(B,B')$ and $\phi(B,B')$ can be used as well in lieu of $\psi(A,A')$ and $\phi(A,A')$.) Thus, two or more colors can be discriminated provided $$|\psi(A,A') - \psi(A,B)| > \sigma_{cc} > 0 \quad (12)$$

$$\text{or } |\Phi(A,A') - \Phi(A,B)| > \sigma_{mvd} > 0 \quad (13)$$

where $\sigma_{cc}$ and $\sigma_{mvd}$ are the discrimination thresholds for cross-correlation and mean-value difference, respectively. $\sigma_{cc}$ and $\sigma_{mvd}$ are small nonzero numbers. If $$|\psi(A,A') - \psi(A,B)| \leq \sigma_{cc} \quad (14)$$

$$\text{and } |\Phi(A,A') - \Phi(A,B)| \leq \sigma_{mvd}, \quad (15)$$

the sample colors of A and B are said to match.

Figure 5:
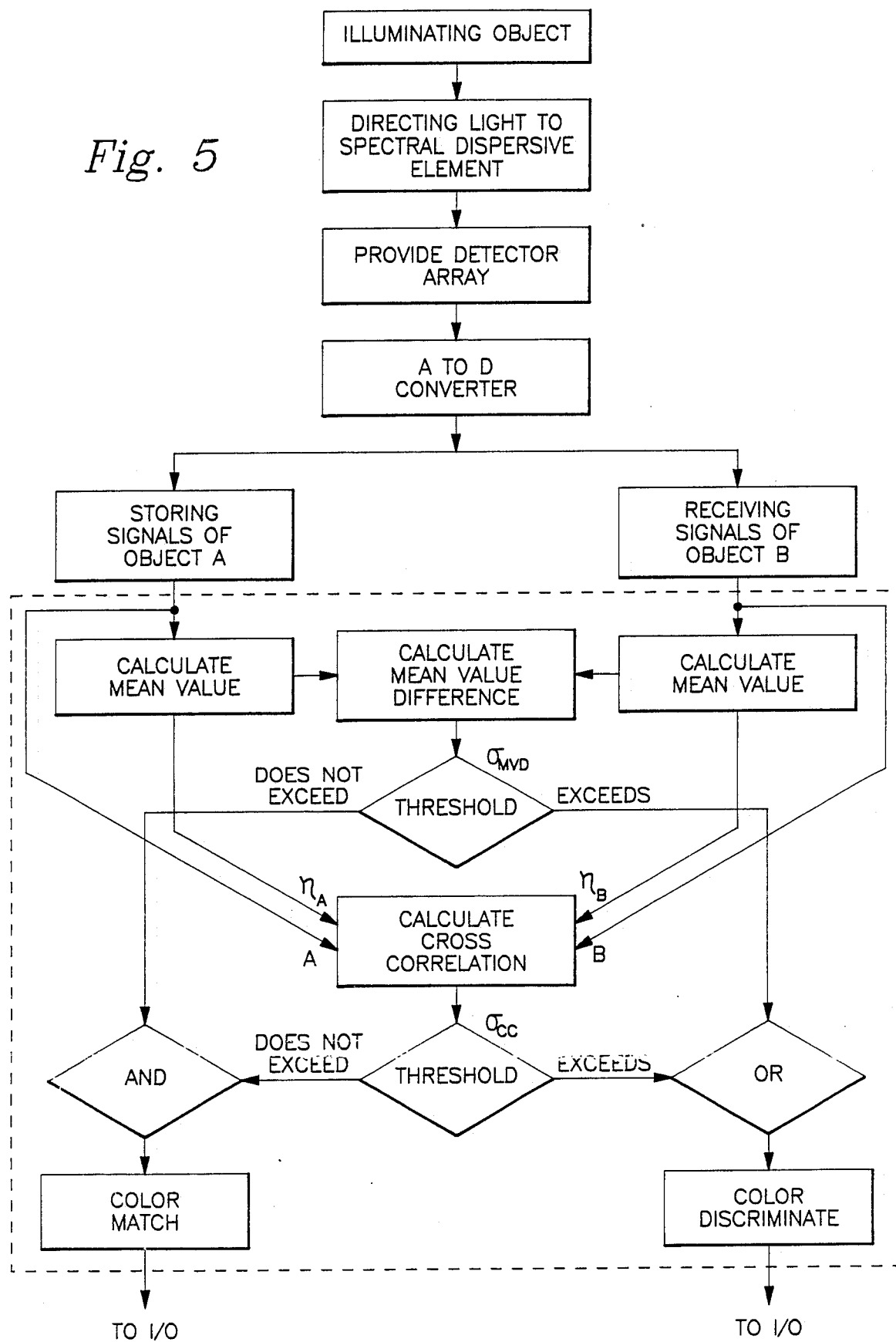
FIG. 5 is a flow chart of the operation of the system shown in FIG. 1.

It is noted that $\psi(A,A')$ and $\Phi(A,A')$ (or $\psi(B,B')$ and $\Phi(B,B')$) may be insufficiently complete descriptions of the total system error, since many more samples of the object A (or B) are necessary in general. Similar arguments apply to $\psi(A,B)$ and $\Phi(A,B)$. Furthermore, it is well known in signal processing that averaging multiple signal acquisitions reduces the level of additive (random) noise and improves the signal-to-noise ratio of the final acquired signal. The signal-to-noise ratio improves in proportion to the square root of the number of waveforms averaged. Thus, for example, $$\overset{m-1}{\underset{i=0}{S}} \bar{a}_i,$$

where $\bar{a}_i = (a_i^1 + a_i^2 + \ldots + a_i^k)/k$ is the mean-value of $a_i$ over k samples, is a better indicator of $I_{mn}(A)$ in the determination of both $\psi$ and $\Phi$. FIG. 5 shows in flow chart form the method steps performed by the aparatus which are described above.

If the optical hardware is designed and configured properly, color determination can be obtained straightforwardly from $I_{mn}$ of any sample. However, optical system imperfections (due to diffraction limitations, nonideal assembly or component performance, or performance/cost tradeoffs) give rise to distorted signals for $L'(\lambda)$ and $I_{mn}$ that cause errors in the color specification. In the terms of network theory, the system transfer characteristic is nonideal and "blurs" the system output. However, since the system impulse response for any spectrally dispersive system, as exemplified in FIG. 1, can be measured using a tunable, monochromatic illumination source over the wavelength band of interest, the optical system transfer characteristic can be determined. Within the spatial quantization error of the linear array (due to the limited number of photodiodes per unit distance x and the active/passive photodiode area ratio), it is possible to deconvolve the system transfer characteristic from the acquired signal to improve effectively the fidelity of the acquisition system. The spatial quantization error can be minimized by maximizing the effective lineal density of photodiodes in the array. This deconvolution concept can be implemented in a signal "deblurring" algorithm that permits use of relatively imprecise/low-cost components to achieve the performance obtainable in precise, high-cost spectrophotometric systems. In other words, this deconvolution concept enables the color signature sensor to emulate expensive, high-performance systems, in the function of color determination without many of the disadvantages (e.g. high cost, low speed, precise alignment and calibration) associated with these conventional systems.

SUMMARY

In this invention it is thus recognized that detected color signature $L'(\lambda)$ is a characteristic and unique descriptor of the color of an illuminated object without need for additional processing or analysis such as is required, for example, for the $L^*a^*b^*$ specification. There is herein used a color discrimination algorithm based on signature cross-correlation and mean-value difference, without need for color determination as is conventional. There is also described the system deconvolution (or signature deblurring) to filter out or compensate for optical system aberrations. This allows the use of inexpensive system optics. Also there is shown use of system autocorrelation output to set recognition threshold for inter-signature cross-correlation and mean-value difference.

The embodiments of the invention in which an exclusive property or right is claimed are defined as follows:

1. A color signature sensor for recognizing color of an object with said sensor having a diffraction grating for spectrally dispersing light received from an object being observed onto a detector array, the detector array having a plurality of photodetectors each photodetector providing an output signal according to the time and space integrated spectrally dispersed light from said object, an analog-to-digital converter to digitize the signals from the detector array with one digitized signal per photodetector to form a digitized set of signals for evaluation in a microprocessor and memory, including in said sensor, microprocessor and memory:

means for illuminating an object B being observed;
diffraction grating means for spectrally dispersing light received from said object B;
means for converting said dispersed light into electrical signals;
means for digitizing the signals;
means for receiving and storing the sampled and digitized sets of signals from a reference object A and from the object B being observed, described collectively as $$I_{mn}(A) = \mathop{S}_{i=0}^{m-1} a_i$$

and $$I_{mn}(B) = \mathop{S}_{i=0}^{m-1} b_i$$

where
m is the number of photodetectors in the array, n is the bit precision of the digitization process, $$\mathop{S}_{i=0}^{m-1} a_i$$

is an ordered sequence of weighted numbers ($a_0$, $a_1$, $a_2 \ldots a_{m-1}$) representing the unnormalized spectral constitution of color object A, $$\mathop{S}_{i=0}^{m-1} b_i$$

is an ordered sequence of weighted numbers ($b_0$, $b_1$, $b_2 \ldots b_{m-1}$) representing the unnormalized spectral constitution of the colored object B; means for determining means values $\eta_a$ and $\eta_b$ according to relations $$\eta_a = (1/m) \sum_{i=0}^{m-1} a_i \text{ and } \eta_b = (1/m) \sum_{i=0}^{m-1} b_i$$

where $\Sigma$ is the summation of the m weighted values; means for determining cross-correlation $\psi$ between $I_{mn}(A)$ and $I_{mn}(B)$ according to a relation $$\psi(A,B) = \frac{\sum_{i=0}^{m-1} (a_i - \eta_a)(b_i - \eta_b)}{\left\{ \sum_{i=0}^{m-1} (a_i - \eta_a)^2 \right\}^{\frac{1}{2}} \left\{ \sum_{i=0}^{m-1} (b_i - \eta_b)^2 \right\}^{\frac{1}{2}}}$$

means for determining means value difference $\phi$ between $I_{mn}(A)$ and $I_{mn}(B)$ according to a relation $\phi(A,B) = \eta_a - \eta_b$; and, means providing a discrimination threshold for cross-correlation $\sigma_{cc}$ and providing a discrimination threshold for mean-value difference $\sigma_{mvd}$, whereby two colors can be discriminated provided $$|\psi(A,A') - \psi(A,B)| > \sigma_{cc} > 0$$

$$|\Phi(A,A') - \Phi(A,B)| > \sigma_{mvd} > 0$$

while if $$|\psi(A,A') - \psi(A,B)| \leq \sigma_{cc}$$

and $$|\Phi(A,A') - \Phi(A,B)| \leq \sigma_{mvd},$$

the sample colors of A and B are said to match.

2. A method for comparing color of an object B as compared with color of a reference A comprising the steps of:

providing illumination to an object B being observed;
providing optical path means for observing a reference object A or an object B and directing light therefrom to a spectral dispersive element;
providing a spectral dispersive element for spectrally dispersing light received on the optical path
providing a detector array for receiving the spectrally dispersed light and converting it to a set of analog electrical signals;
receiving and converting a set of analog signals representative of color of the reference A to a set of digital signals;
storing the digital signals, representative of the reference color A, described collectively as $$I_{mn}(A) = \mathop{S}_{i=0}^{m-1} a_i \text{ where}$$

m is a number of photodetectors, n is bit precision of the digitization process, $$\mathop{S}_{i=0}^{m-1} a_i$$

is an ordered sequence of weighted numbers ($a_0$, $a_1$, $a_2 \ldots a_{m-1}$) representing unnormalized spectral constitution of colored object A; receiving and converting similarly a set of digital signals representative of object color B, described collectively as $$I_{mn}(B) = \mathop{S}_{i=0}^{m-1} b_i \text{ where}$$

$$\sum_{i=0}^{m-1} b_i$$

is an ordered sequence of weighted numbers ($b_0$, $b_1$, $b_2$ ... $B_{m-1}$) representing the unnormalized spectral constitution of colored object B; determining the mean-values $\eta_a$ and $\eta_b$ according to two relations $$\eta_a = (1/m) \sum_{i=0}^{m-1} a_i \text{ and } \eta_b = (1/m) \sum_{i=0}^{m-1} b_i$$

where $\Sigma$ is the summation of m weighted values; determining cross-correlation $\psi$ between $I_{mn}(A)$ and $I_{mn}(B)$ according to a relation $$\psi(A,B) = \frac{\sum_{i=0}^{m-1}(a_i - \eta_a)(b_i - \eta_b)}{\left\{\sum_{i=0}^{m-1}(a_i - \eta_a)^2\right\}^{\frac{1}{2}} \left\{\sum_{i=0}^{m-1}(b_i - \eta_b)^2\right\}^{\frac{1}{2}}}$$

determining mean-value difference $\phi$ between $I_{mn}(A)$ and $I_{mn}(B)$ according to a relation $\phi(A,B) = \eta_a - \eta_b$; providing a discrimination threshold for cross-correlation $\sigma_{cc}$ and providing a discrimination threshold for mean-value difference $\sigma_{mvd}$; and, comparing object A and object B values whereby two colors can be discriminated provided $$|\psi(A,A') - \psi(A,B)| > \sigma_{cc} > 0$$

or $$|\Phi(A,A') - \Phi(A,B)| > \sigma_{mvd} > 0$$

while if $$|\psi(A,A') - \psi(A,B)| \leq \sigma_{cc}$$

and $$|\Phi(A,A') - \Phi(A,B)| \leq \sigma_{mvd},$$

the sample colors of A and B are said to match.

3. A color signature sensor for recognizing color of an object with said sensor having a diffraction grating for spectrally dispersing light received from an object being observed onto a detector array, the detector array having a plurality of photodetectors each photodetector providing an output signal corresponding to the time and space integrated intensity of a specific band of pure color wavelengths in the light from said object, an analog-to-digital converter to digitize the signals from the detector array to form a digitized set of signals for evaluation in a microprocessor and memory, including in said microprocessor and memory:

means for receiving and storing sampled and digitized sets of a signals from a reference object A and from an object B being observed, described collectively as an ordered sequence of weighted numbers representing a unnormalized spectral constitution of colored object A and of colored object B;

means for determining mean-values of said digitized sets of signals;

means for determining cross-correlation between said sets of signals;

means for determining mean-value difference between the set of signals from reference object A and the set of signals from reference object B; and, means for providing a discrimination threshold and providing a mean-value difference discrimination threshold whereby two colors can be discriminated or matched.

4. A method for comparing color of an object B as compared with color of a reference A comprising the steps of:

providing optical path means for observing a colored reference object A and directing light therefrom to a spectral dispersive element;

providing a spectral dispersive element for spectrally dispersing light received on the optical path;

providing a detector array for receiving the spectrally dispersed light and converting it to a set of analog electrical signals;

receiving and converting a set of analog signals representative of color of the reference A to a set of digital signals;

storing the digital signals, representative of the reference color A, described collectively as an ordered sequence of weighted numbers representing the unnormalized spectral constitution of the colored object A;

receiving and converting similarly a set of signals representative of object color B, described collectively as an ordered sequence of weighted numbers representing the unnormalized spectral constitution of the colored object B;

determining mean-values of said digital sets of signals;

determining cross-correlation between said sets of signals;

determining mean-value difference between the first and second set of signals;

providing a discrimination threshold for cross-correlation and providing a discrimination threshold for mean-value difference; and, comparing object A and object B correlations and mean-value difference values whereby two colors can be discriminated.

* * * * *